United States Patent [19]
Cunningham et al.

[11] Patent Number: 5,752,555
[45] Date of Patent: May 19, 1998

[54] RIM CLAMP TIRE CHANGER MOUNTING HEAD ADJUSTMENT RELEASE MECHANISM

[76] Inventors: Charles L. Cunningham, 6001 Robert E. Lee Dr., Nashville, Tenn. 37215; David M. Carpenter, 1412 Lipscomb Dr., Brentwood, Tenn. 37027

[21] Appl. No.: 551,720

[22] Filed: Nov. 1, 1995

[51] Int. Cl.⁶ .................................................. B60C 25/135
[52] U.S. Cl. .............................................. 157/1.24; 157/1.2
[58] Field of Search .............................. 157/1.24, 1.17, 157/1.2, 1.22, 1.26, 1.28

[56] References Cited

U.S. PATENT DOCUMENTS

| | | | |
|---|---|---|---|
| 2,773,529 | 12/1956 | Valenti | 81/177.7 X |
| 4,581,959 | 4/1986 | Troiano | 81/177.9 |
| 4,896,712 | 1/1990 | du Quesne | 157/1.24 |

*Primary Examiner*—D. S. Meislin
*Attorney, Agent, or Firm*—Waddey & Patterson; I. C. Waddey, Jr.

[57] ABSTRACT

A quick release mechanism for the mount/dismount head of a rim holding tire changer, including a wedge plate that overlies the top of the horizontal bar and has an opening in registry with the opening in the sleeve through which the vertical bar passes. The opening in the wedge plate is shaped to mate with the cross-sectional profile of the vertical bar and is only slightly larger than the size of the bar. Thus, when the wedge plate is horizontal so that the axis of the opening is aligned with the axis of the opening of the sleeve, the vertical bar will move freely up and down in response to pressure on the vertical bar. The wedge plate has protrusions on its under side on one side of the opening and the protrusions rest on the upper face of the sleeve. A actuation handle is attached to the underside of the wedge plate and depends perpendicularly from it. The actuation handle is arcuate so that it mates with the outer perimeter of the sleeve and when held against the sleeve, the axis of the opening of the wedge plate will be aligned with the axis of the opening of the sleeve and the bar will be free to move within the sleeve. On the end of the wedge plate opposite the actuation handle is a spring biasing that end of the wedge arm downwardly. This action causes the angle of the axis of the opening through the wedge plate to be askew to the axis of the opening of the sleeve, thereby reducing the length of the opening by the angle of the thickness of the plate, causing the plate to wedge against the vertical bar and bind it against movement vertically within the sleeve. By this structure, the vertical bar will be held in place unless the operator grips the actuation handle and forces it against the sleeve against the pressure of the spring, causing the openings to be aligned and releasing the vertical bar for movement within the opening of the sleeve.

5 Claims, 5 Drawing Sheets

RIM CLAMP TIRE CHANGER MOUNTING HEAD ADJUSTMENT RELEASE MECHANISM

BACKGROUND OF THE INVENTION

The present invention relates generally to rim holding tire changers and more particularly to a quick release mechanism for use in connection with the vertical adjustment feature of the mount/demount head used on rim holding tire changers.

It will be appreciated by those skilled in the art of designing and manufacturing equipment used to change the tubeless tires mounted on the rims of cars, trucks and other vehicles that it is highly desirable to have equipment that enables the operator to rapidly clamp a rim, change the tire off the rim and remove the rim from the tire changer. Speed in the tire changing business means greater productivity for the shop and increased profits.

The type of equipment for which Applicant's invention is designed is known generally in the industry as a rim holding tire changer and examples of the type of equipment involved are the rim holding tire changers manufactured by Hennessy Industries, Inc., Applicant's assignee, and marketed under the trademarks "COATS®" and "AMMCO®" including the COATS® models 5030A and the model 5060A-E and 5060AX-EX. However, there are many manufacturers of such equipment, including FMC Corporation of Chicago, Ill., Corghi of Correggio, Italy and Sice of Correggio, Italy. Equipment of this type has been readily available in the market for many years, is the subject matter of numerous patents and has been described in a variety of publications, bulletins, brochures, operating and instruction manuals, and the like. One such machine is illustrated in the design patent issued to one of the Applicant's as co-inventor in U.S. Des. Pat. No. 293,916.

In the operation of the equipment for which Applicants' invention is designed, a replacement tire is mounted on a rim by first placing the rim carrying the tire to be replaced onto a changer table, clamping the under perimeter of the rim on the table, engaging a mount/demount head about the upper perimeter of the rim, using a lifter bar to pull a portion of the upper tire bead over the mount/demount head, rotating the rim and tire on the table while holding the mount/demount head stationary, thus causing the mount/demount head to lift the upper bead of the tire over the rim. The process is repeated to lift the lower bead of the tire over the rim to dismount the tire from the rim. The replacement tire is mounted onto the rim by reversing the process to first force the lower bead of the tire onto the rim and then force the upper bead onto the rim. If all four tires of a car are being changed, the entire process is repeated three more times.

To change the tires of the next customer, the process is repeated; however, the next customer will probably have a different model car with a different rim style. If that is the case, the location of the mount/demount head will have to be adjusted. The mount/demount head is attached to the end of a vertical bar which fits within a sleeve. The sleeve is mounted to the end of a horizontal bar which is pivotally connected at its other end to the rim holding tire changer machine. The movement of the horizontal arm about the pivotal connection allows lateral adjustment of the head, and movement of the bar within the sleeve allows vertical adjustment of the head. However, the head must be fixed vertically onto the outer perimeter of the rim to hold it into place as the table rotates to cause the head to lift the bead of the tire over the rim.

Speed in the tire changing process would be facilitated by the ability to fix the vertical position of the head easily and quickly with a minimum of effort. Such a device is presently unavailable. The release mechanisms currently in use generally employ a handle functioning as a lever to engage and disengage a boss against the bar in the sleeve. The movement of the handle must be done carefully (and therefore slowly) in order not to "bump" or otherwise shift the position of the head. Other release mechanisms have similar drawbacks.

SUMMARY OF THE INVENTION

Applicants' invention is a quick release mechanism for the mount/dismount head of a rim holding tire changer, including a wedge plate that overlies the top of the horizontal bar and has an opening in registry with the opening in the sleeve through which the vertical bar passes. The opening in the wedge plate is shaped to mate with the cross-sectional profile of the vertical bar and is only slightly larger than the size of the bar. Thus, when the wedge plate is horizontal so that the axis of the opening is aligned with the axis of the opening of the sleeve, the vertical bar will move freely up and down in response to pressure on the vertical bar. The wedge plate has protrusions on its under side on one side of the opening and the protrusions rest on the upper face of the sleeve, thereby providing a seesaw pivot for its movement. A actuation handle is attached to the underside of the wedge plate and depends perpendicularly from it. The actuation handle is arcuate so that it mates with the outer perimeter of the sleeve and when held against the sleeve, the axis of the opening of the wedge plate will be aligned with the axis of the opening of the sleeve and the bar will be free to move within the sleeve. On the end of the wedge plate opposite the actuation handle is a spring biasing mechanism forcing that end of the wedge arm downwardly. This action causes the angle of the axis of the opening through the wedge plate to be skewed to the axis of the opening of the sleeve, thereby reducing the length of the opening by the angle of the thickness of the plate, causing the plate to wedge against the vertical bar and bind it against movement vertically within the sleeve. By this structure, the vertical bar will be held in place unless the operator grips the actuation handle and forces it against the sleeve against the pressure of the spring, causing the openings to be aligned and releasing the vertical bar for movement within the opening of the sleeve.

DESCRIPTION OF THE PREFERRED EMBODIMENT

Figure 1:
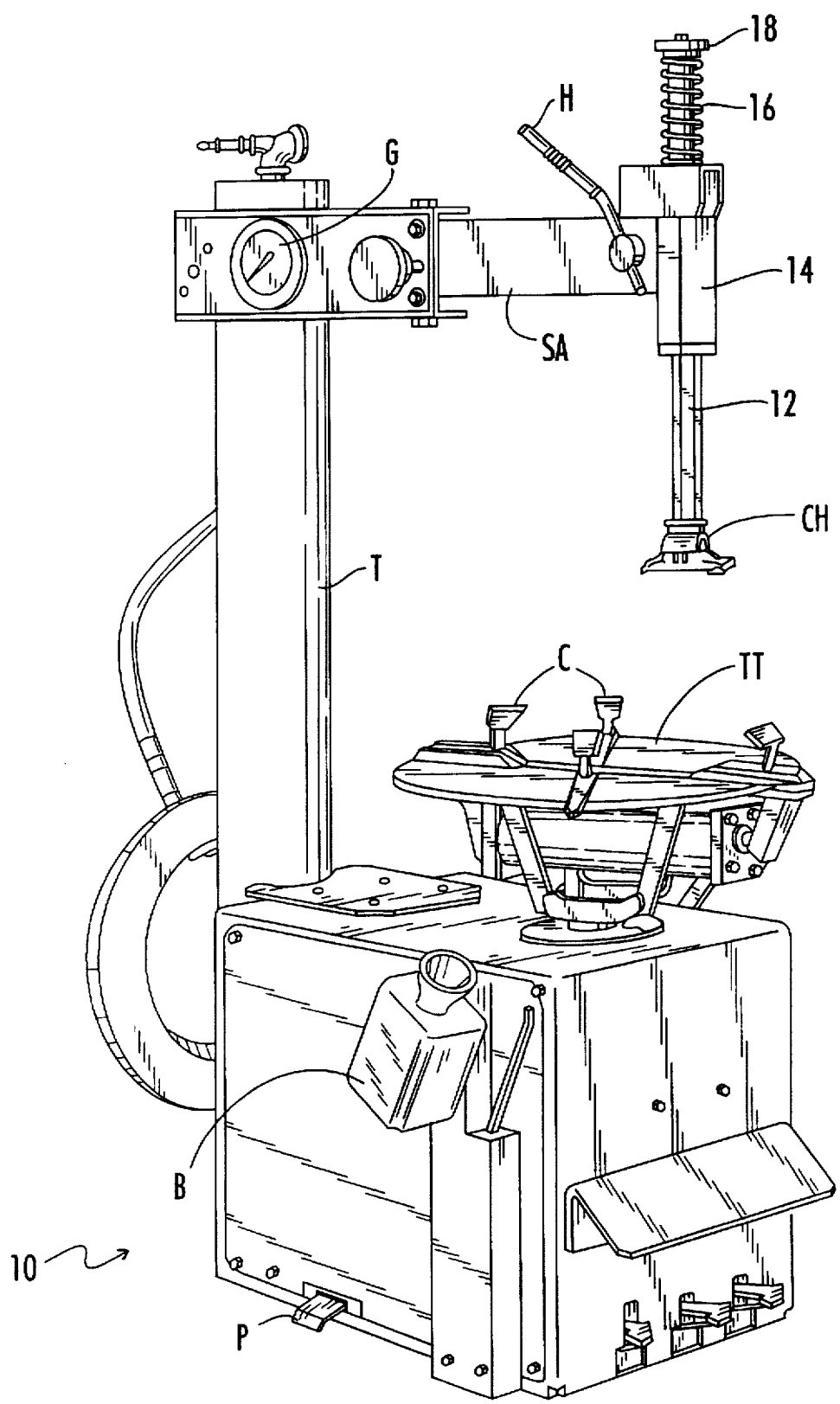
FIG. 1 is an illustration in perspective view of a prior art rim holding tire changer of the type to which Applicant's invention is particularly adaptable.

Applicant's invention will be best understood when considered in light of the following description of the preferred embodiment of the invention, as illustrated in FIGS. 2-9 of the attached drawings wherein like reference numerals refer to like parts.

FIG. 1 of the attached drawings show a rim holding tire changer with a typical lever release mechanism for the vertical bar on which the mount/demount head is attached. The tire changer includes a tower T, an air gauge G, an inflation pedal P, a table top TT, clamps C, a lube bottle B, a combination mount/demount head CH, and a swing arm SA.

Using this equipment, an automobile tire rim with a tire mounted thereon is placed on the table top TT of the rim holding tire changer 10 and the rim is grasp and held in place by clamps C provided on the table. The clamps C can fit within the open hub of the rim and move radially outwardly to grasp the inside perimeter of the hub or they can be located outside the rim and move radially inwardly to clamp the rim. The swing arm SA is rotated about its pivotal connection to place the combination mount/dismount head CH in a position proximate the outside perimeter of the rim and the head is raised or lowered by movement of the vertical bar 12 to place the head in a position to engage the rim.

The combination mount dismount head CH is attached to the lower end of the vertical bar 12 and the vertical bar 12 extends up through the sleeve 14, through a coil spring 16 and terminates with a cap 18 that holds the spring 16 in place and also serves as a handle for raising and lowering the vertical bar 12.

In the prior art type devices, a handle H was pivotally mounted on the swing arm SA. A shaft passed through the sides of the swing arm with a boss penetrating into an opening in the sleeve 14 so that when the handle H was rotated, the boss would engage the side of the vertical bar 12 and hold it in place. In this prior art type device, pulling the handle to rotate the boss into engagement with the vertical bar would sometimes cause the combination mount/dismount head to be moved from its desired location and the pivoting of the boss against the side of the vertical bar 12 could also shift the bar 12 to mis-align it with the outer perimeter of the upper rim of the tire on the table.

Referring now to FIGS. 2-8. Applicant's invention is illustrated as a replacement for the prior art engagement/ release devices just described.

Figure 2:
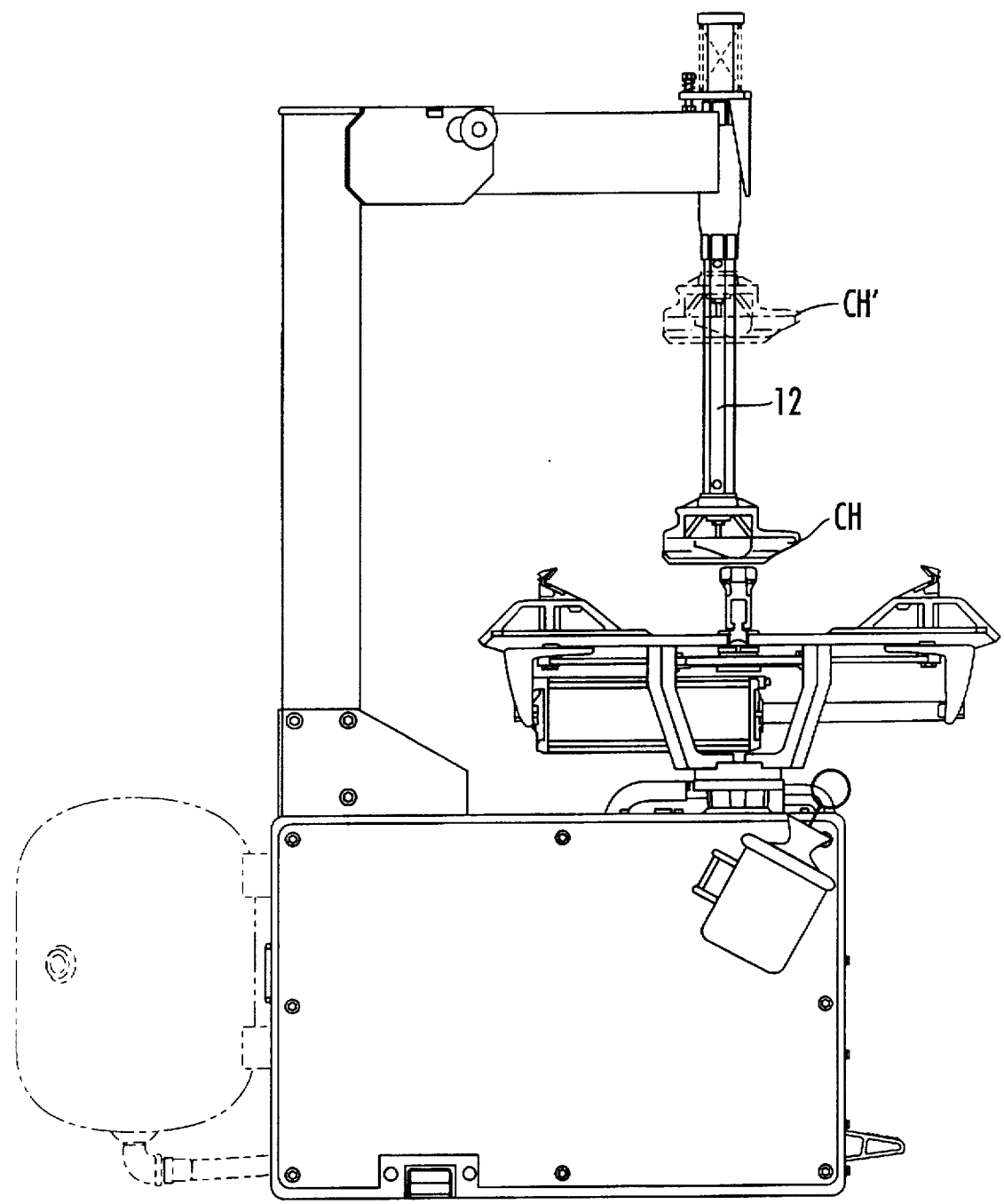
FIG. 2 is a side view of the device of FIG. 1 showing Applicant's quick release mechanism substituted for the prior art type release mechanism.

As can be seen from FIG. 2, the combination head can be raised and lowered with the raising and lowering of the vertical bar 12. FIG. 2 illustrates the combination mount/ dismount head in the lower position and in phantom lines the combination head CH' is illustrated in the raised position. The raising and lowering of the combination mount/ dismount head occurs by the operator placing his hand on the cap 18 and pressing down against the pressure of the spring 16 so that the combination head will be lowered to the desired location. The spring 16 will raise the combination head when the pressure being applied by the operator is released unless the vertical bar is latched by the mechanism described herein.

Figure 3:
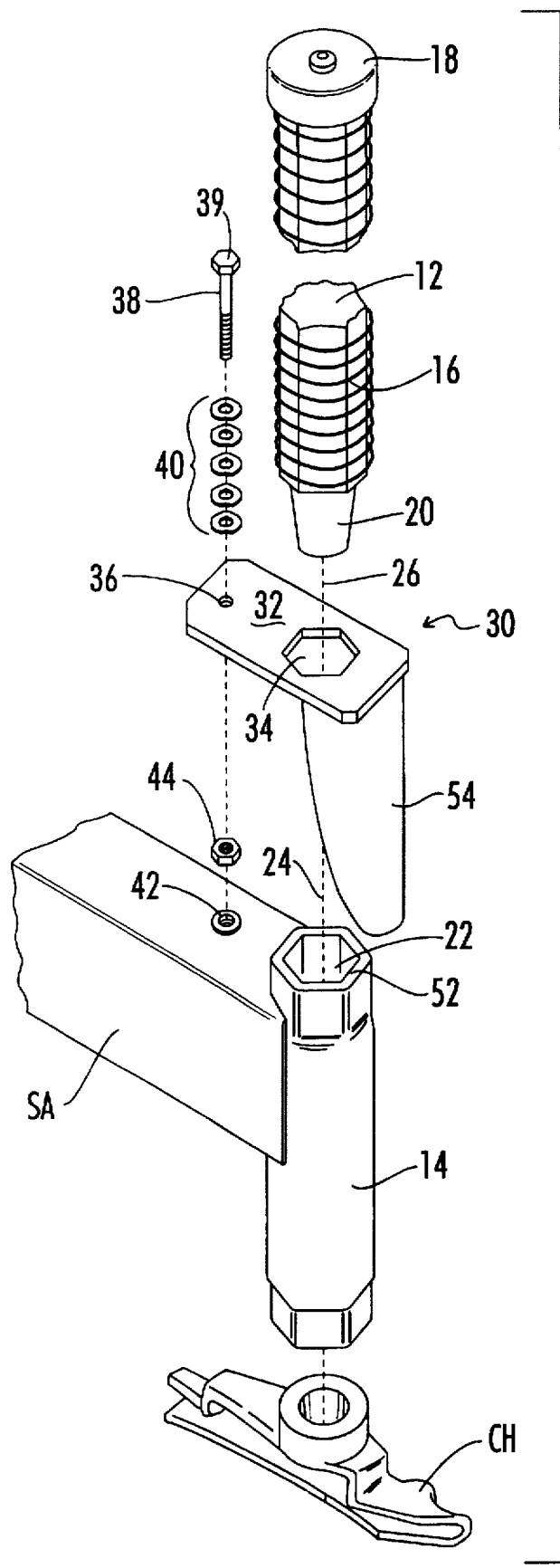
FIG. 3 illustrates in perspective exploded view the improvement of Applicant's invention.

FIG. 3 shows the latching mechanism and quick release device of Applicant's invention in exploded perspective. The swing arm SA is illustrated with a sleeve 14 connected to the end thereof. The combination head CH is shown below the sleeve 14 and the combination head is carried by the lower end 20 of the vertical bar 12 after the vertical bar 12 is passed through the sleeve 14 into operating position. The vertical bar is shown broken in order to reduce its length, but the actual length of the bar is sufficient to allow the combination head to be lowered into engagement with the outer perimeter of the upper portion of the rim of a tire sitting on the table and can be moved substantially upwardly out of position when the tire is being removed from the table TT. The coil spring 16 is illustrated schematically in FIG. 3 along with the cap 18.

The sleeve 14 has an opening 22 passing through its length along the axis 24 which is aligned with the axis 26 of the vertical bar 12. The release mechanism 30 of Applicant's invention includes a wedge plate 32 having an opening 34 passing through one end of the wedge plate 32. At the opposite end of the wedge plate 32 is a hole 36 for receiving the bolt 38 which carries the wafer springs 40. The bolt 38 can be threaded on its lower end to screw into the threaded opening 42 in the top side of the swing arm SA, and a lock nut 44 can be used to adjust the height of the bolt 38 and thereby adjust the pressure being applied on the top side of the wedge plate 32 by the wafer springs 40.

The opening 34 of the wedge plate 32 has a shape and size substantially equal to the shape and size of the cross sectional profile of the vertical bar 12. In this particular case, the vertical bar has a cross sectional profile that is hexagonal and the shape of the opening 22 in the sleeve 14 is hexagonal as is the shape of the opening 34 in the wedge plate 32. The size and shape of the vertical bar 12 mates with the opening 22 in the sleeve 12 so that the vertical bar 12 can slide up and down in the sleeve 12. The dimensions of the vertical bar 12 and the opening 34 are maintained in close tolerance so that when the axis of the opening 34 is aligned with the axis 24 of the opening 22 of the sleeve 14, the vertical bar 12 can slide up and down freely within the two openings. However, if the wedge plate 32 is tilted so that the axis of the opening 34 is askew to the axis of 24 of the opening 22 and the sleeve 14, the tilting of the plate 32 will result in the reduction in the size of the opening along the line of tilt when measured perpendicular to the axis 26 of the vertical bar 12. The reduction in the size of the opening will cause the wedge plate to bind or wedge against the vertical bar 12 and prevent it from moving either up or down.

Figure 4:
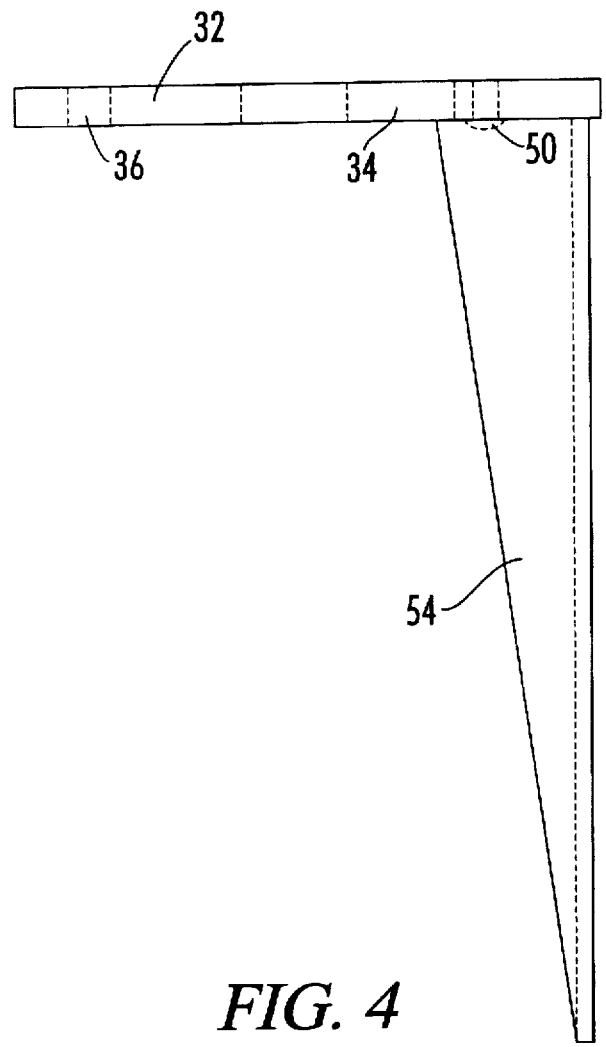
FIG. 4 illustrates a side view of the actuator for Applicant's invention.
Figure 5:
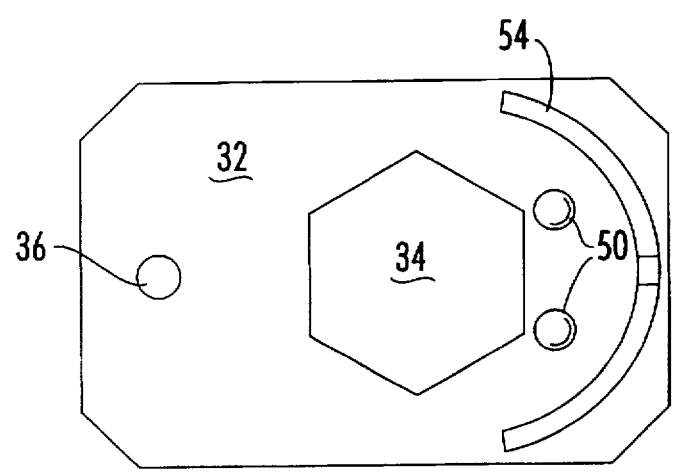
FIG. 5 shows a bottom view of the actuator mechanism of Applicant's invention.
Figure 6:
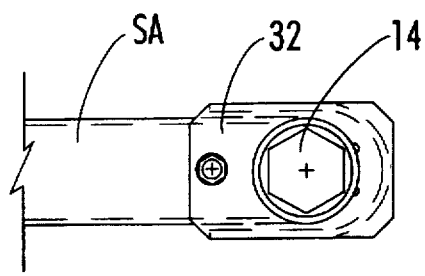
FIG. 6 shows a top view of the invention.

As can be best seen from FIGS. 4 and 5, protrusions 50 are provided on the underside of wedge plate 32. The protrusions 50 are located such that when opening 34 is in registry with opening 22, the protrusions 50 ride on the upper flat surface 52 of the sleeve 14. The protrusions 50 are on one side of the opening 34 so that the underside of the wedge plate 32 does not sit flat on the flat surface 52 of the sleeve 14.

Figure 7:
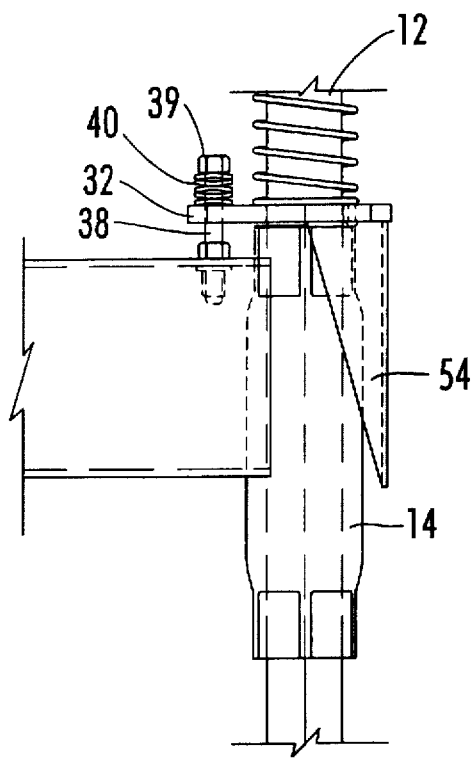
FIG. 7 shows a side view of the device with the actuator mechanism in the release position.
Figure 8:
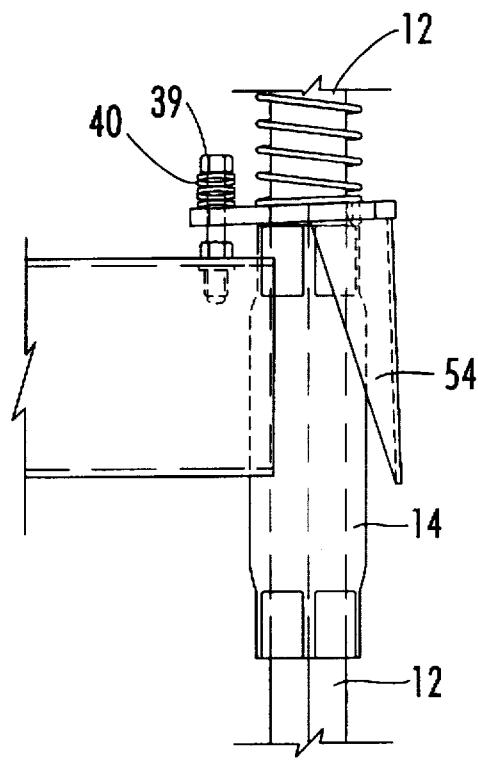
FIG. 8 shows a side view of the device with the actuator mechanism engaged.

The actuation handle 54 of the release mechanism of the present invention is connected to the first end of the wedge plate 32 and is arcuate in shape and designed to mate with the outer perimeter of the sleeve 14. When the actuation handle 54 is pressed against the sleeve 14, the device will be configured as is illustrated in FIG. 7 with the wedge plate 32 being in a plane that is perpendicular to the axis 26 of the vertical bar 12. To maintain this position, the actuating arm 54 must be held in place against the pressure of the wafer springs 40 that rest underneath the head 39 of the bolt 38. The wafer springs 40 would tend to force the wedge plate 32 downwardly into the position shown in FIG. 8 which would cause the axis of the opening 34 through the wedge plate to be skewed to the axis of 26 of the vertical bar 12. Thus, in operation, in the at rest position, the actuation handle 54 of the device of the present invention would tend to be rotated about the point of intersection of the protrusions 50 with the upper surface 20 of the sleeve 14 in a counter-clockwise direction as is shown in FIGS. 8 because the pressure of the wafer springs 40 on the end of the wedge plate 32. In that position, the wedge plate 32 would bind against the vertical bar 12 and lock it into place. When an operator desired to move the vertical bar 12 within the sleeve 14, he would activate the release mechanism by simply gripping the sleeve 14 with the actuation handle 54 under his palm and pressing the actuation handle 54 against the outer perimeter of the sleeve 14. This pressure on the actuation handle 54 would cause the device to rotate about the pivot point of the intersection of the protrusions 50 with the upper surface 52 of the sleeve 14 in a clockwise direction, offsetting the pressure of the wafer springs 40 to raise the wedge plate 32 into a position so that the axis of the opening 34 would be aligned with the axis 26 of the vertical bar 12. This alignment of the axis of the opening 34 with the axis 26 would increase the size of the opening 34 when measured perpendicular to the axis 26 of the vertical bar 12 and thereby release the binding pressure on the vertical bar 12 and allow it to be moved up or downwardly depending upon whether the operator allowed the pressure of the coil spring 16 to raise the vertical bar or applied downward pressure on the cap 18 to force the vertical bar 12 downwardly through the sleeve 14.

The operation of the device as described allows the operator to adjust the height of the vertical bar 12 quickly and with minimal or no disturbance of the location of the combination mount/dismount head CH once it is located in the desired position. The location of the mount/dismount head, once selected, can be fixed by simply releasing the grip on the actuating arm 54. The pressure of the wafer springs 40 on the upper side of the wedge plate 32 will cause the wedge plate 32 to rotate about its pivot point created by the intersection of the protrusions on the upper surface 52 of the sleeve 54 in a counter-clockwise direction, mis-aligning the axis of the opening 34 with the axis 26 of the bar 12, reducing the size of the opening and gripping the vertical bar 12 with a wedge or binding force.

The operation of this quick release vertical adjustment mechanism can save many hours over years of use and allow a tire changing operator to perform his duties at a greater rate of production. Greater production means less labor costs and more profit for the operator.

Although there have been described particular embodiments of the present invention of a new and useful Rim Clamp Tire Changer Mounting Head Adjustment Release Mechanism is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A rim holding tire changer including a table on which a vehicle rim is positioned for purposes of changing a tire on said rim, further including a combination mount/dismount head used to facilitate the mounting of a tire on the rim and the dismounting of a tire from the rim, means mounting said combination mount/dismount head for selective movement into engagement with and out of engagement from the rim of a tire mounted on the table of the rim holding tire changer, said combination mounting/dismounting head being carried by a bar, a sleeve, said bar passing through said sleeve and movable within said sleeve to adjust the relative height of the combination mount/dismount head, the improvement including a wedge plate juxtaposing said sleeve, an opening through said wedge plate, said wedge plate has at least one protrusion spacing said wedge plate from said sleeve, said at least one protrusion serving as a fulcrum on which said wedge plate rocks, said wedge plate positioned whereby said bar passes through the opening in said wedge plate, means mounting said wedge plate for movement from an at rest position and an activated position, the size and shape of said opening being configured relative to the cross sectional size and shape of said bar whereby when said wedge plate is moved to the activated position, the bar will slide axially within the opening in said wedge plate is in the and when said wedge plate is in the at rest position, the size of the opening will be reduced and wedged against said bar to prevent movement of the bar in said opening.

2. The invention as set forth in claim 1 further including means to releasably hold said wedge plate in said at rest position.

3. The invention as set forth in claim 2 wherein said means releasably holding said wedge plate is a spring.

4. The invention as set forth in claim 1 further including an actuating handle attached substantially perpendicular to said wedge plate.

5. The invention as set forth in claim 1 wherein said opening and said bar each having an axis and wherein the said axes are parallel when said wedge plate is in said activated position and are askew when said wedge plate is in said at rest position.

* * * * *